US008715127B2

(12) United States Patent
Beutler et al.

(10) Patent No.: US 8,715,127 B2
(45) Date of Patent: May 6, 2014

(54) AXLE ASSEMBLY WITH AXLE HOUSING ASSEMBLY HAVING AIR SCOOPS FOR COOLING

(75) Inventors: Kevin R Beutler, Columbiaville, MI (US); James P Borowiak, Grand Blanc, MI (US); Gregory J Hilker, Canton, MI (US); David C Johnson, Lapeer, MI (US); Rajendra D Patil, Westland, MI (US); Jeffrey E Rea, Ames, IA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1286 days.

(21) Appl. No.: 12/342,734

(22) Filed: Dec. 23, 2008

(65) Prior Publication Data
US 2009/0173184 A1 Jul. 9, 2009

Related U.S. Application Data

(60) Provisional application No. 61/018,982, filed on Jan. 4, 2008.

(51) Int. Cl.
*F16H 57/04* (2010.01)

(52) U.S. Cl.
USPC .......................................... 475/161; 74/606 R

(58) Field of Classification Search
USPC .......................................... 74/606 A; 475/161
See application file for complete search history.

(56) References Cited

U.S. PATENT DOCUMENTS

| 1,200,172 | A | | 10/1916 | Danver |
| 1,950,034 | A | | 3/1934 | Mulford et al. |
| 2,015,108 | A | | 9/1935 | Harper |
| 2,211,155 | A | | 8/1940 | Oshei |
| 2,325,647 | A | | 8/1943 | Adamson |
| 2,477,576 | A | | 8/1949 | Buckendale |
| 2,478,180 | A | | 8/1949 | Buckendale |
| 3,138,222 | A | | 6/1964 | Dames |
| 4,915,192 | A | * | 4/1990 | Hayashida et al. ........... 180/309 |

(Continued)

FOREIGN PATENT DOCUMENTS

| GB | 1115446 A | 5/1968 |
| JP | 05-106710 | 4/1993 |
| JP | 11-005403 A | 1/1999 |

OTHER PUBLICATIONS

Written Opinion of the International Searching Authority for International Application No. PCT/US2008/069297, dated Jan. 30, 2009.

*Primary Examiner* — Justin Holmes
(74) *Attorney, Agent, or Firm* — Harness, Dickey & Pierce, P.L.C.

(57) ABSTRACT

An axle assembly having a heat sink coupled to an axle housing assembly for ejecting heat from the axle assembly. The heat sink includes an air channel having a body coupled to the carrier housing assembly such that heat is conducted from the carrier housing assembly to the body of the air channel and an air passage formed in the body and having an open leading end and an open trailing end, the leading end being positioned relative to the carrier housing assembly to permit air flowing over the axle assembly when the axle assembly is in use to be received into the air passage such that heat is conducted from the body to the air flowing through the air passage, and the trailing end being positioned relative to the carrier housing assembly to permit air received in the air passage to be expelled through the trailing end.

21 Claims, 8 Drawing Sheets

(56) References Cited

U.S. PATENT DOCUMENTS

| | | | |
|---|---|---|---|
| 5,072,784 A * | 12/1991 | Stenlund | 165/47 |
| 5,316,106 A | 5/1994 | Baedke et al. | |
| 5,927,384 A * | 7/1999 | Waldner, Jr. | 165/47 |
| 6,036,615 A | 3/2000 | Young et al. | |
| 6,065,369 A | 5/2000 | Kosuge et al. | |
| 6,135,241 A | 10/2000 | Ganguly et al. | |
| 6,432,018 B1 * | 8/2002 | Morse et al. | 475/161 |
| 6,553,865 B1 * | 4/2003 | Endreszl | 74/607 |
| 6,725,743 B2 | 4/2004 | White | |
| 6,779,834 B1 * | 8/2004 | Keller | 296/180.4 |
| 6,830,096 B1 * | 12/2004 | Fett et al. | 165/41 |
| 6,954,944 B2 * | 10/2005 | Feher | 2/171.3 |
| 6,997,284 B1 | 2/2006 | Nahrwold | |
| 7,188,699 B2 | 3/2007 | Moore et al. | |
| 2006/0090591 A1 | 5/2006 | Graeve | |

* cited by examiner

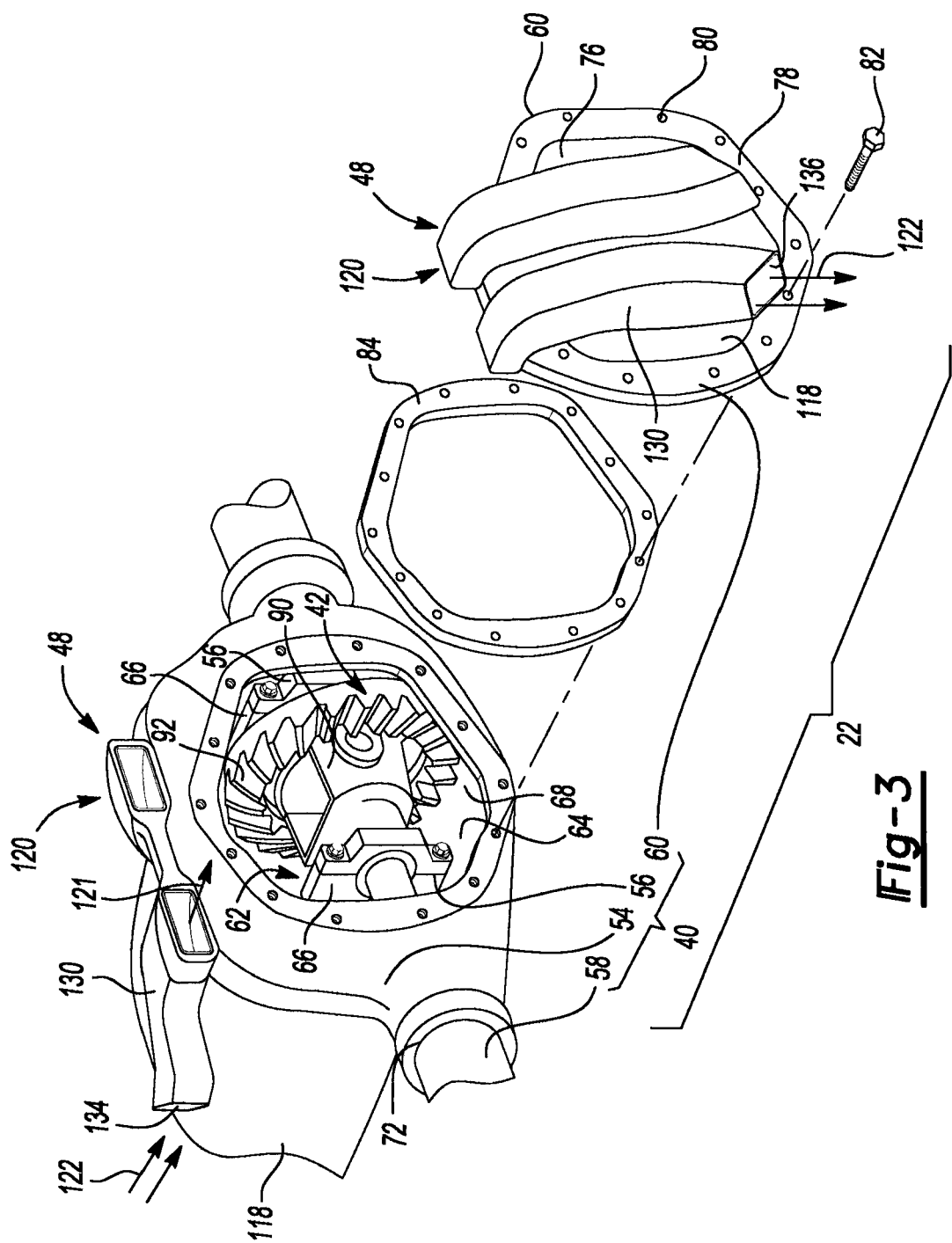

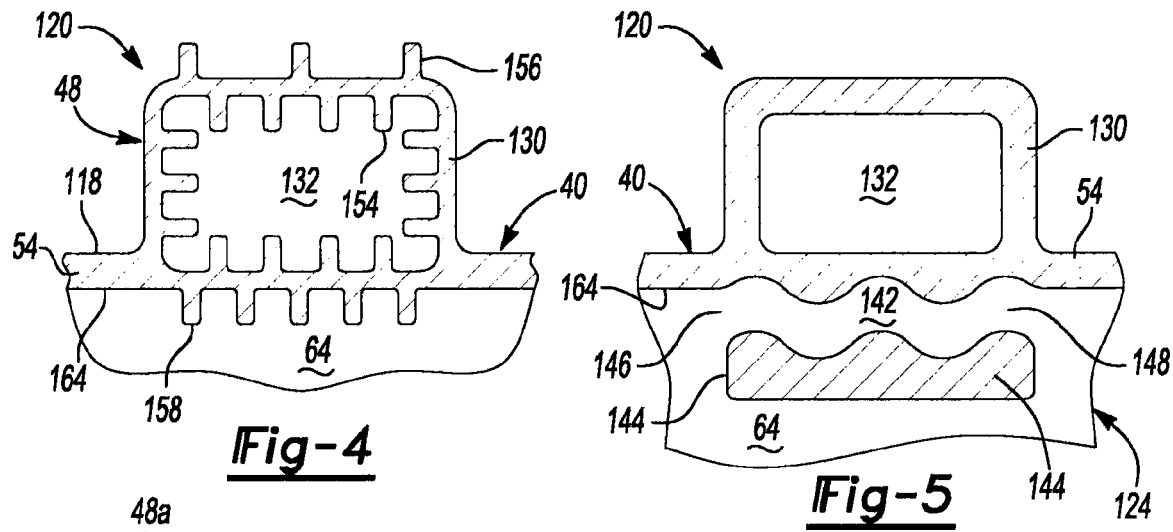
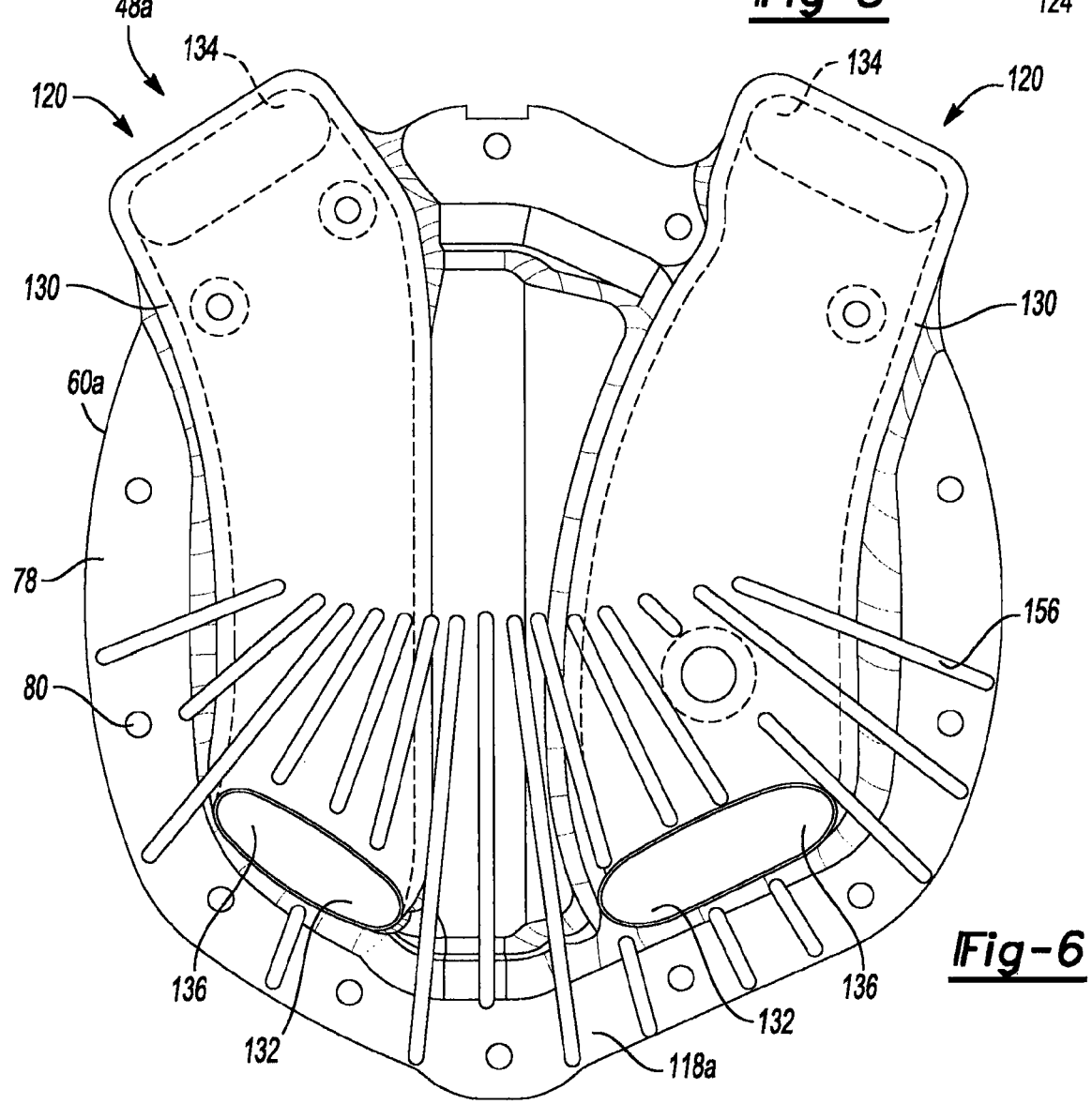

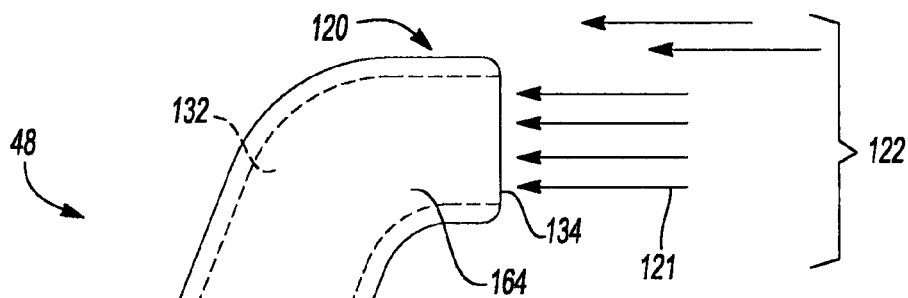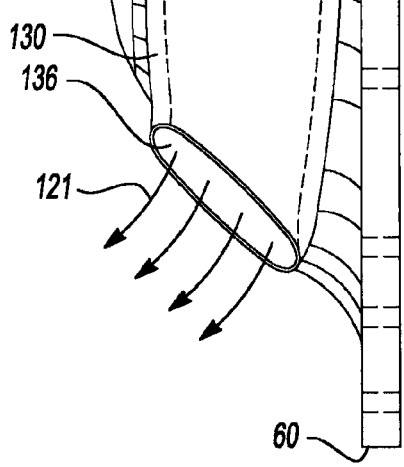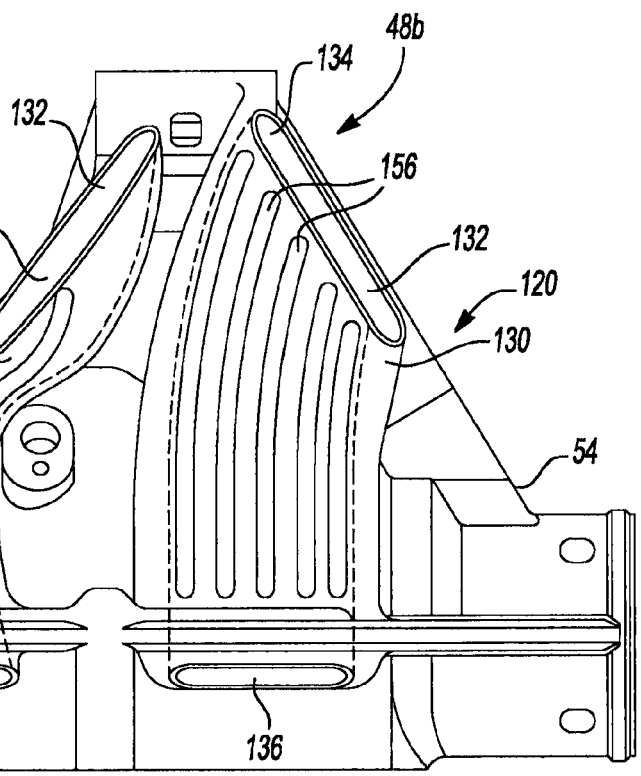
Fig-7
Fig-8

US 8,715,127 B2

AXLE ASSEMBLY WITH AXLE HOUSING ASSEMBLY HAVING AIR SCOOPS FOR COOLING

CROSS-REFERENCE TO RELATED APPLICATIONS

This application claims the benefit of U.S. Provisional Application No. 61/018,982, filed on Jan. 4, 2008, the entire disclosure of which is incorporated in its entirety herein by reference.

The present invention generally relates to axle assemblies and more particularly to an axle assembly having improved heat rejection capabilities.

An axle assembly for a motor vehicle includes internal moving parts that generate heat during operation of the axle assembly. It is desirable that heat generated in the axle assembly during its operation be controlled. For example, excessive heat could cause premature breakdown of the lubricant within the axle assembly.

Some conventional axle assemblies employ the housing of the axle assembly to reject heat. In this regard, lubricant within the axle assembly is typically splashed onto the various gears within the axle assembly and heat from the gears is absorbed by the lubricant. This heat is transmitted to the housing of the axle assembly, which can in turn reject the heat to the surrounding air. Rejection of heat from the axle assembly to the surrounding air by convection is preferable as convection can be a relatively quick heat transfer process.

We have found, however, that air sometimes does not flow well over portions of the axle assembly in a moving vehicle and, consequently, convection is not effectively employed in the rejection of heat from these portions.

SUMMARY

In one form, the present teachings provide a carrier housing assembly having a carrier housing that defines a cavity with an opening, a differential housing received in the cavity, the differential housing being supported for rotation by the carrier housing about a first axis, a gearset received in the differential housing, a ring gear coupled to the differential housing, a pinion received in the cavity and supported for rotation about a second axis that is perpendicular to the first axis, and an air channel having a body coupled to the carrier housing assembly such that heat is conducted from the carrier housing assembly to the body of the air channel and an air passage formed in the body and having an open leading end and an open trailing end, the leading end being positioned relative to the carrier housing assembly to permit air flowing over the axle assembly when the axle assembly is in use to be received into the air passage such that heat is conducted from the body to the air flowing through the air passage, and the trailing end being positioned relative to the carrier housing assembly to permit air received in the air passage to be expelled through the trailing end.

In another form, the present teachings provide a carrier housing that defines a cavity with an opening, a differential housing received in the cavity, the differential housing being supported for rotation by the carrier housing about a first axis, a gearset received in the differential housing, a ring gear coupled to the differential housing, a pinion received in the cavity and supported for rotation about a second axis that is perpendicular to the first axis, a cover that is removably coupled to the carrier housing to close the opening in the carrier housing, and an air channel integrally formed with the cover, the air channel having a body coupled to the cover such that heat is conducted from the cover to the body of the air channel and an air passage formed in the body and having an open leading end and an open trailing end, the leading end being positioned relative to the cover to permit air flowing over the axle assembly when the axle assembly is in use to be received into the air passage such that heat is conducted from the body to the air flowing through the air passage, and the trailing end being positioned relative to the cover to permit air received in the air passage to be expelled through the trailing end.

In yet another form, the present teachings provide a a carrier housing that defines a cavity, a differential housing received in the cavity, the differential housing being supported for rotation by the carrier housing about a first axis, a gearset received in the differential housing, a ring gear coupled to the differential housing, a pinion received in the cavity and supported for rotation about a second axis that is perpendicular to the first axis, and an air channel integrally formed with the carrier housing, the air channel having a body coupled to the carrier housing such that heat is conducted from the carrier housing to the body of the air channel and an air passage formed in the body and having an open leading end and an open trailing end, the leading end being positioned relative to the carrier housing to permit air flowing over the axle assembly when the axle assembly is in use to be received into the air passage such that heat is conducted from the body to the air flowing through the air passage, and the trailing end being positioned relative to the carrier housing to permit air received in the air passage to be expelled through the trailing end.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is an exploded perspective view of a portion of the axle assembly of FIG. 2;

FIG. 4 is cross-sectional view of a heat sink with optional cooling ribs constructed in accordance with the teachings of the present disclosure;

FIG. 5 is cross-sectional view of a heat sink with an optional oil gallery constructed in accordance with the teachings of the present disclosure;

FIG. 6 is an elevation view of another heat sink constructed in accordance with the teachings of the present disclosure;

FIG. 7 is a side view of the heat sink of FIG. 6;

FIG. 8 is an elevation view of another heat sink constructed in accordance with the teachings of the present disclosure;

DETAILED DESCRIPTION OF THE VARIOUS EMBODIMENTS

Figure 1:
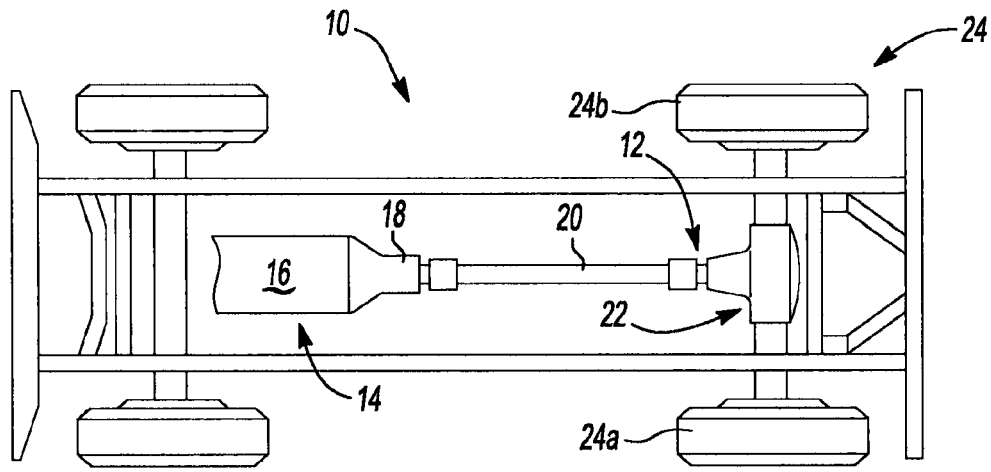
FIG. 1 is a schematic illustration of an exemplary vehicle having an axle assembly constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportion in a predetermined manner to the left and right rear wheels 24a and 24b, respectively.

Figure 2:
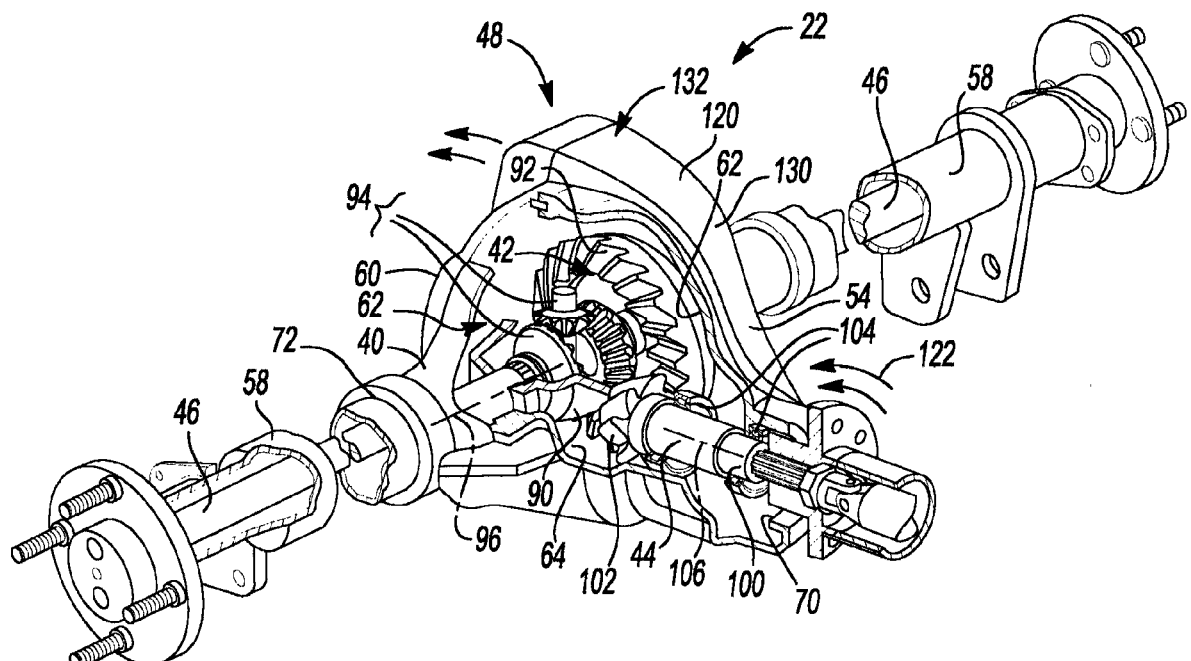
FIG. 2 is a partially broken away perspective view of a portion of the vehicle of FIG. 1 illustrating the axle assembly in more detail.

With reference to FIGS. 2 and 3, the rear axle 22 can include an axle housing assembly 40, a differential 42, an input pinion assembly 44, a pair of axle shafts 46, and a heat sink 48.

In the particular example provided, the axle housing assembly 40 includes a carrier housing 54, a pair of bearing caps 56, a pair of axle tubes 58 and a cover 60. The axle housing 40 can define an internal cavity 62 that forms a fluid sump 64 in which a liquid lubricant (for lubricating the differential 42 and input pinion assembly 44) is located. The carrier housing 54 can include a pair of bearing journals 66, a differential aperture 68, which can be disposed on a first side of the carrier housing 54, a pinion aperture 70, which can be disposed on a second side of the carrier housing 54 opposite the differential aperture 68, and a pair of axle tube apertures 72 that can intersect the opposite lateral sides of the internal cavity 62. The bearing caps 56 can be removably coupled to the bearing journals 66. The axle tubes 58 can be received in the axle tube apertures 72 and can be fixedly coupled to the carrier housing 54. The cover 60 can include a body portion 76 and a flange portion 78 that can be coupled to the carrier housing 54. The body portion 76 can be three-dimensionally contoured (e.g., bulged outwardly) to effectively increase the volume within the differential axle housing assembly 40. The flange portion 78 can extend about the body portion 76 and in the particular example provided, includes a plurality of through holes 80 that permit the cover 60 to be removably coupled to the carrier housing 54 (via a plurality of threaded fasteners 82). It will be appreciated that a gasket 84 or a sealant (not shown), such as a room-temperature vulcanizing sealant, an anaerobic sealant or a non-hardening sealant, can be employed to seal the interface between the cover 60 and the carrier housing 54.

The differential 42 can be any appropriate vehicle differential and can conventionally include a case 90, a ring gear 92, which can be coupled to the case 90, and a gearset 94 that can be housed in the case 90. The differential 42 can be received into the internal cavity 62 through the differential aperture 68. The bearing journals 66 and the bearing caps 56 can cooperate to support the differential 42 for rotation in the internal cavity 62 about a first rotational axis 96.

The input pinion assembly 44 can conventionally include an input shaft 100 and an input pinion 102 that can be coupled for rotation with the input shaft 100. The input pinion assembly 44 can be received into the carrier housing 54 through the pinion aperture 70 such that the input pinion 102 is meshingly engaged to the ring gear 92. A pair of bearings 104 can be coupled to the carrier housing 54 and the input shaft 100 and can support the input pinion assembly 44 for rotation about a second rotational axis 106 that can be generally perpendicular to the first rotational axis 96. An end of the input shaft 100 opposite the input pinion 102 can be adapted to be coupled to a driveline component, such as the propshaft 20 (FIG. 1), to receive rotary power therefrom.

Each of the axle shafts 46 can be received through an associated one of the axle tubes 58 and can be coupled for rotation with an associated side gear 108 in the gearset 94 of the differential 42. Accordingly, it will be appreciated that rotary power input to the axle 22 via the input pinion assembly 44 is transmitted through the ring gear 92, to the case 90 and the gearset 94 and output to the axle shafts 46 to provide propulsive power to the left and right rear wheels 24a and 24b (FIG. 1).

The heat sink 48 can be coupled to an exterior surface 118 of the axle housing assembly 40 that is formed by one or more members of the axle housing assembly 40, such as the carrier housing 54 and/or the cover 60, and can be employed to aid in the rejection of heat from the axle housing assembly 40. The heat sink 48 can include one or more air channels 120 configured to receive respective portions 121 of an air stream 122 flowing around the axle housing assembly 40 when vehicle 10 is propelled in a predetermined direction to thereby direct a flow of air (i.e., portion(s) 121) over a predetermined portion of axle housing assembly 40. An optional oil gallery 124 or optional oil cavity ribs 158 can be disposed within the fluid sump 64 to even further enhance rejection of heat from the axle housing assembly 40.

Each air channel 120 can be made of any desired material, including a material having a relatively high coefficient of thermal conductivity, such as, for example, cast iron, steel, or aluminum. Each air channel 120 can be coupled to the exterior surface 118 of the axle housing assembly 40 and can include a body 130 having an air passage 132 formed therethrough that extends between an air inlet 134 and an air outlet 136. The body 130 can be formed in one or more sections (two sections are illustrated in FIGS. 2 and 3) and each section can be co-formed with a component of the axle housing assembly 40 or can be discretely formed and coupled to a component of the axle housing assembly 40. The body 130 can follow a desired two- or three-dimensional path that can be complimentary to a predetermined portion of the exterior surface 118. The air channel 120 can be routed along portions of the exterior surface 118 that are generally adjacent to the fluid sump 64 or to "hot spots". Routed in this manner, the air channel 120 provides a substantially constant flow of cooling air to the desired location on the exterior surface 118. The air passage 132 can follow a course between the air inlet 134 and the air outlet 136 that can be similar to or different from the path of the body 130 (i.e., the air passage 132 can, but need not, follow a course that is coincident with the path of the body 130). In this manner, the body 130 can be configured to advantageously maintain contact between the body 130 and the exterior surface 118 along the length of air passage 132, and the air channel 120 can be configured to advantageously direct air flow over a predetermined portion of the exterior surface 118. While the air passage 132 is illustrated as having a generally rectangular cross-section, it will be appreciated from this disclosure that the air passage 132 can be configured having any desired cross-sectional shape and that the cross-sectional shape and/or area need not be constant over the length of the air channel 120. Moreover, the air channel 120 could be formed with one or more internal ribs 154 or external ribs 156 as shown in FIG. 4 to increase the surface area over which heat may be rejected from the axle housing assembly 40 and/or the heat sink 48. The external ribs 156 can also be orientated to distribute portions of the air stream 122 over the exterior surface 118 in a desired manner. While not specifically shown, it will be appreciated that ribs similar to the external ribs 156 could also be formed on the exterior surface 118. Such ribs could be disposed on portions of the exterior surface 118 that may or may not be proximate the heat sink 48. Where such ribs are proximate the heat sink 48, the ribs could be disposed generally in-line with the external ribs 156. Similarly, interior ribs 158 could be formed on component of the axle housing 40 (e.g., the carrier housing 54) to increase the interior surface area that is contacted as lubricant is splashed over the interior of the axle housing assembly 40. While the air passage ribs 154, external ribs 156, and oil cavity ribs 158 are illustrated as having a generally rectangular cross-section, the person skilled in the art will appreciate that the ribs can have any cross-sectional shape, such as triangular or trapezoidal cross-sections, and that the cross-sectional size and shape can vary along a length of the ribs.

Returning to FIGS. 2 and 3, the air inlet 134 can be disposed at a leading end (i.e., upstream relative to the air outlet 136) of the air passage 132 and orientated to capture the portion 121 of the air stream 122. The air outlet 136 can be disposed at a trailing end (i.e., downstream relative to the air inlet 134) of the air passage 132 and orientated in a manner that permits the captured portion 121 of the air stream 122 to exit the air outlet 136.

With specific reference to FIG. 4, a plurality of air passage ribs 154 can protrude from the body 130 of the air channel 120 into the air passage 132. The air passage ribs 154 can generally extend from the air inlet 134 to the air outlet 136 while generally following the axial path of the air channel 120. A plurality of external ribs 156 can protrude outwardly from the body 130 of the air channel 120 and extend into the air stream 122.

In FIG. 5, a component of the axle housing assembly 40, such as the carrier housing 54, can include a wall member 144 into which an oil gallery 124 can be formed. The oil gallery 124 can be a passage 142 that is configured to direct lubricant that is splashed onto the wall member 144 to a location proximate the air channel 120 as the lubricant drains back to the fluid sump 64.

Returning to FIGS. 2 and 3, the liquid lubricant in the sump 64 can be slung by the differential 42 as the vehicle 10 (FIG. 1) is operated. In this regard, rotating elements of the differential 42 can pass through the liquid lubricant in the sump 64 and a portion of the liquid lubricant that clings to the rotating elements can be slung outwardly due to centrifugal force. Heat can be rejected by the internal components of the rear axle 22 to the liquid lubricant; this heat can thereafter be rejected by the liquid lubricant to the axle housing assembly 40. In turn, heat can be rejected from the axle housing assembly 40 by convection via the portion 121 of air that flows through the heat sink 48 when the vehicle 10 (FIG. 1) is propelled in the predetermined direction. Additionally, heat may be conducted from the axle housing assembly 40 to the heat sink 48, especially where the air channels are formed of a thermally conductive material.

Another heat sink 48a is illustrated in FIGS. 6 and 7. The heat sink 48a can include a plurality of air channels 120 wherein the respective body 130 of each air channel 120, as well as optional features such as the oil gallery 124 (FIG. 5), the oil cavity ribs 158 (FIG. 4), the external ribs 156, and air passage ribs 154 (FIG. 4), are integrally formed with the cover 60a utilizing a suitable manufacturing process, such as investment casting (e.g, lost foam casting). The air channels 120 can be disposed on opposite sides of a vertical plane extending through the rotational axis 106 (FIG. 2). The respective air inlets 134 can be disposed generally at the top of axle housing assembly 40 (FIG. 2) where the cover 60a is coupled to the carrier housing 54 (FIG. 2) and orientated generally perpendicularly to (or "in-line" with) the air stream 122. Each air passage 132 can be generally L-shaped and can include a short leg 164 extending generally horizontally from the respective air inlet 134 and a longer leg 166 extending generally vertically down the length of cover 60a to respective air outlets 136 disposed generally near the bottom of the axle housing assembly 40 (FIG. 2).

The external ribs 156 can be vertically disposed at a height that can be generally complimentary to a fluid level of the cooling fluid disposed within the fluid sump 64 (FIG. 2). The external ribs 156 can extend down the length of the cover 60a in a desired manner, such as in a radially fanned pattern, to distribute the air stream 122 along the exterior surface 118a of cover 60a.

Figure 9:
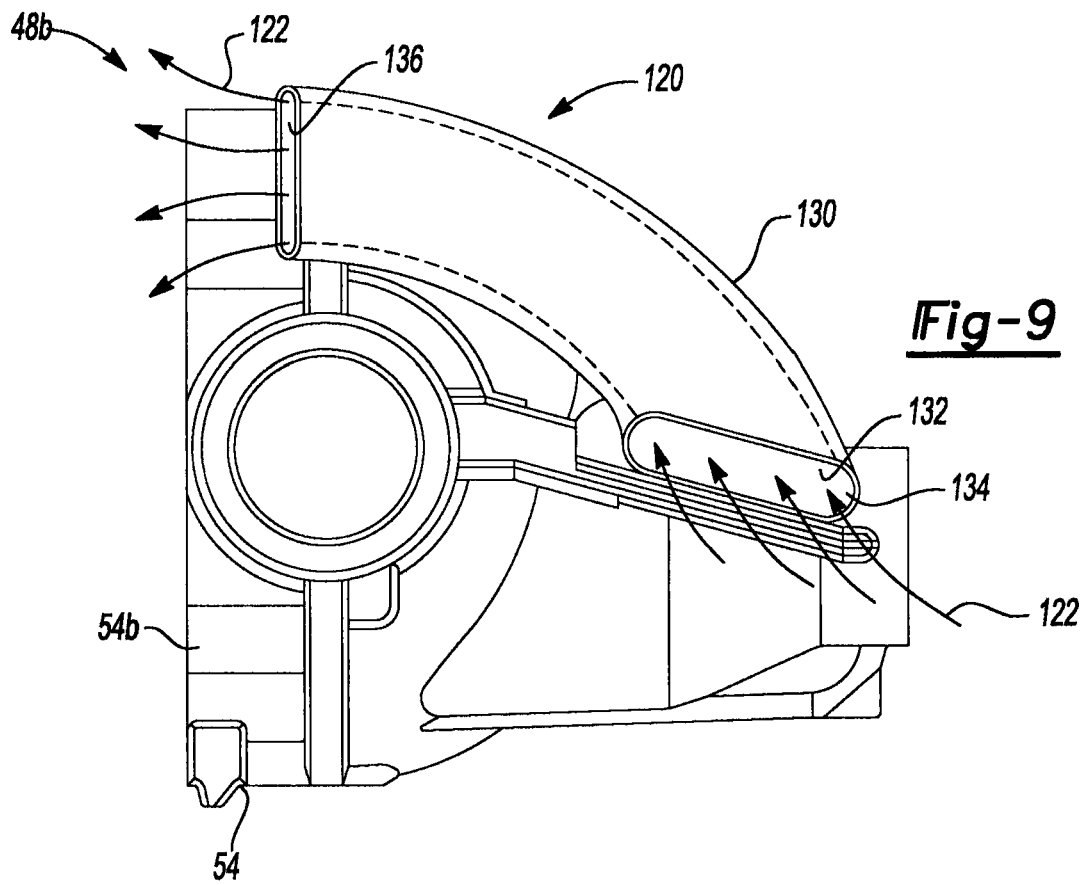
FIG. 9 is a side view of the heat sink of FIG. 8.
Figure 10:
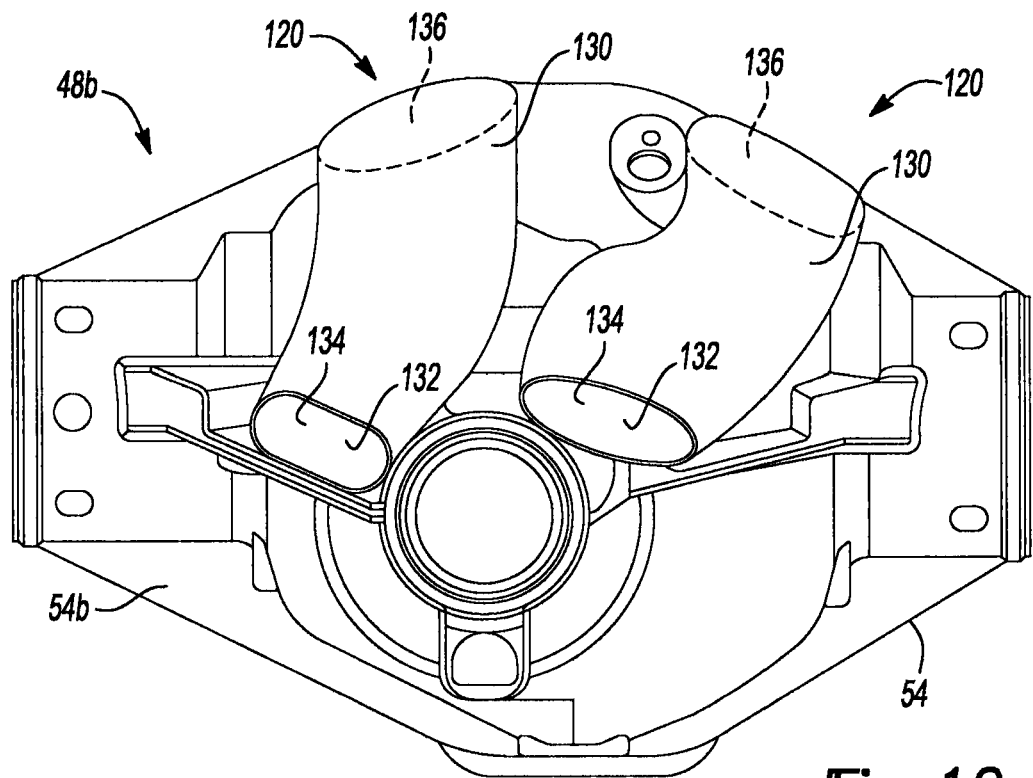
FIG. 10 is a front view of the heat sink of FIG. 8.
Figure 11:
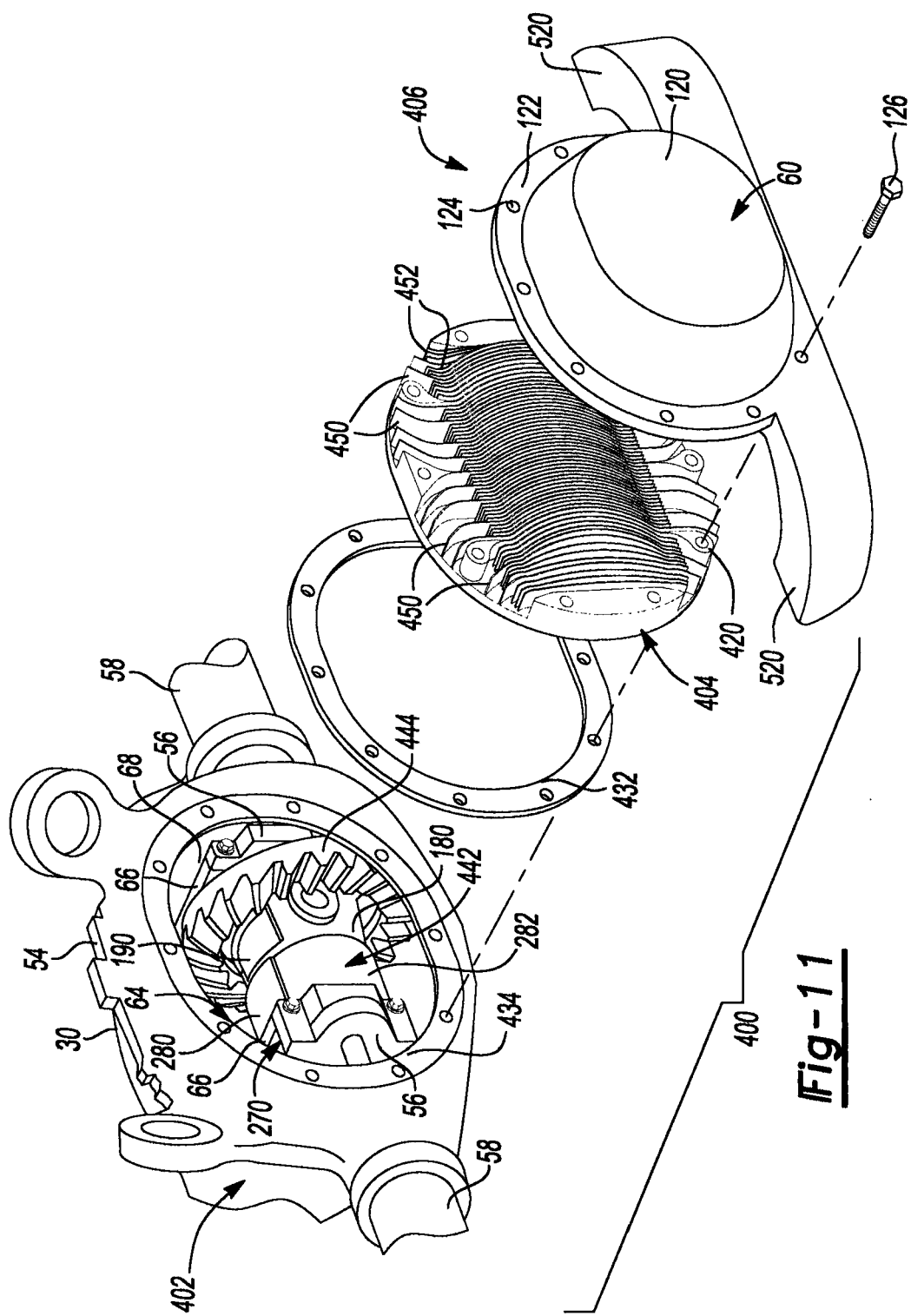
FIG. 11 is an exploded perspective view of a portion of another axle assembly constructed in accordance with the teachings of the present disclosure.
Figure 12:
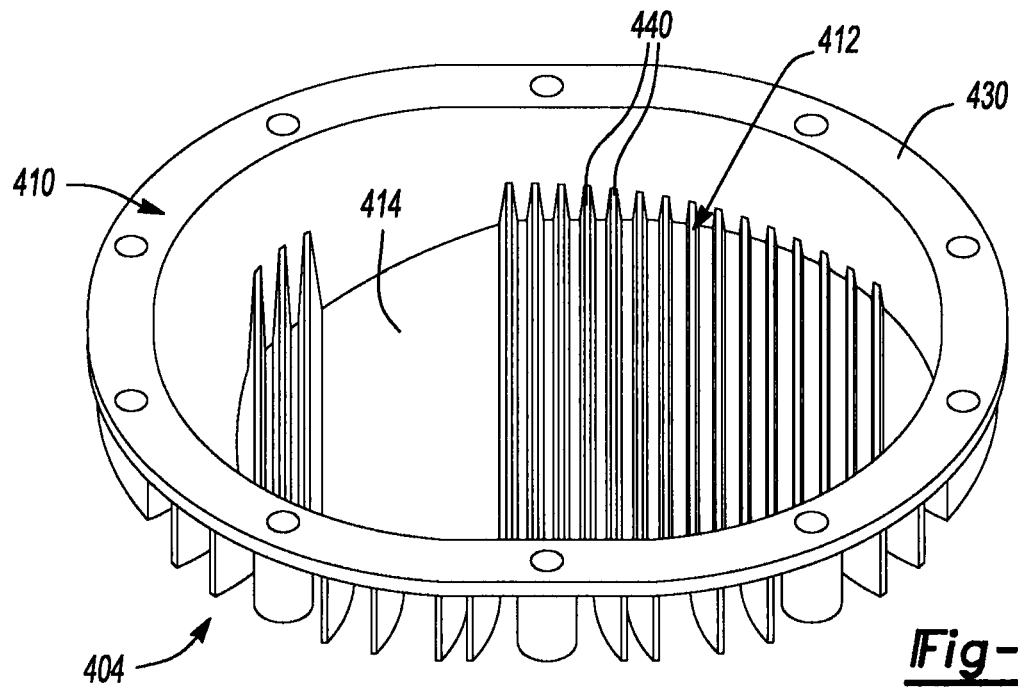
FIG. 12 is a perspective view of a portion of the axle assembly of FIG. 11, illustrating an interior side of a first cover.
Figure 13:
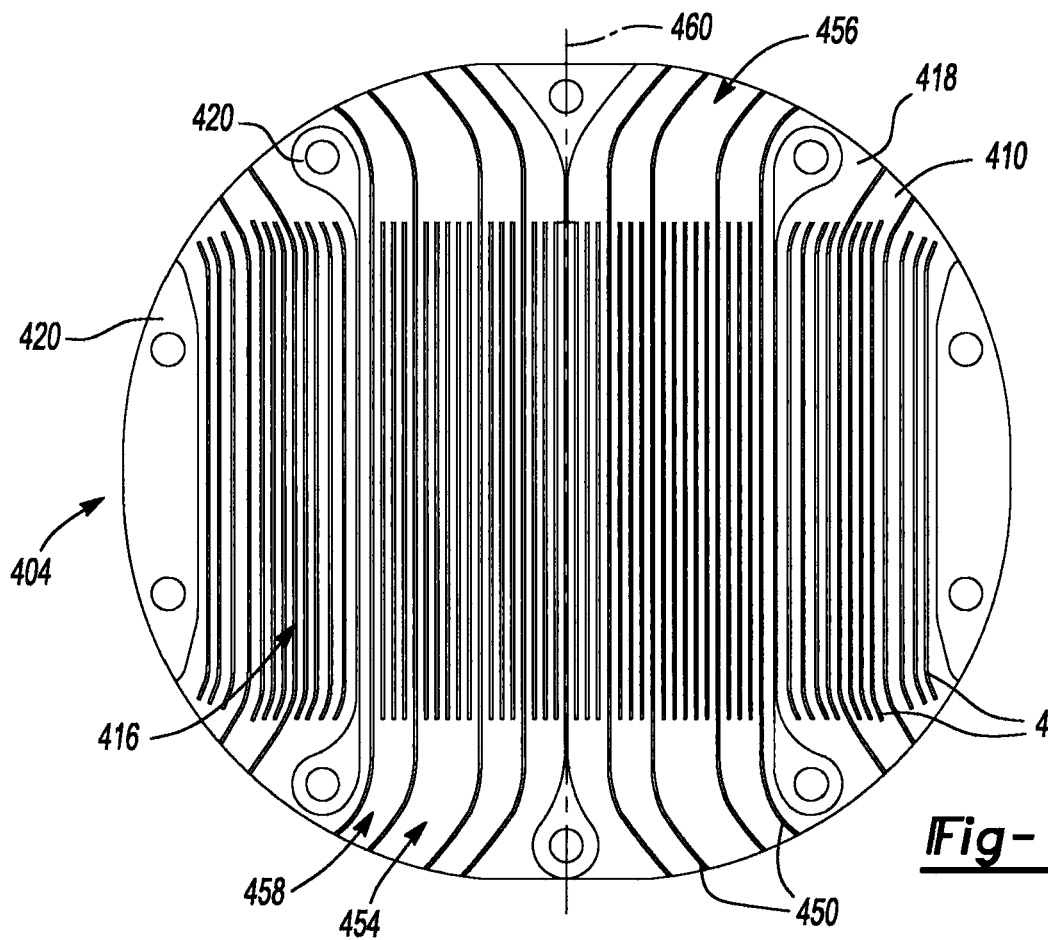
FIG. 13 is an elevation view of illustrating an exterior side of the first cover.
Figure 14:
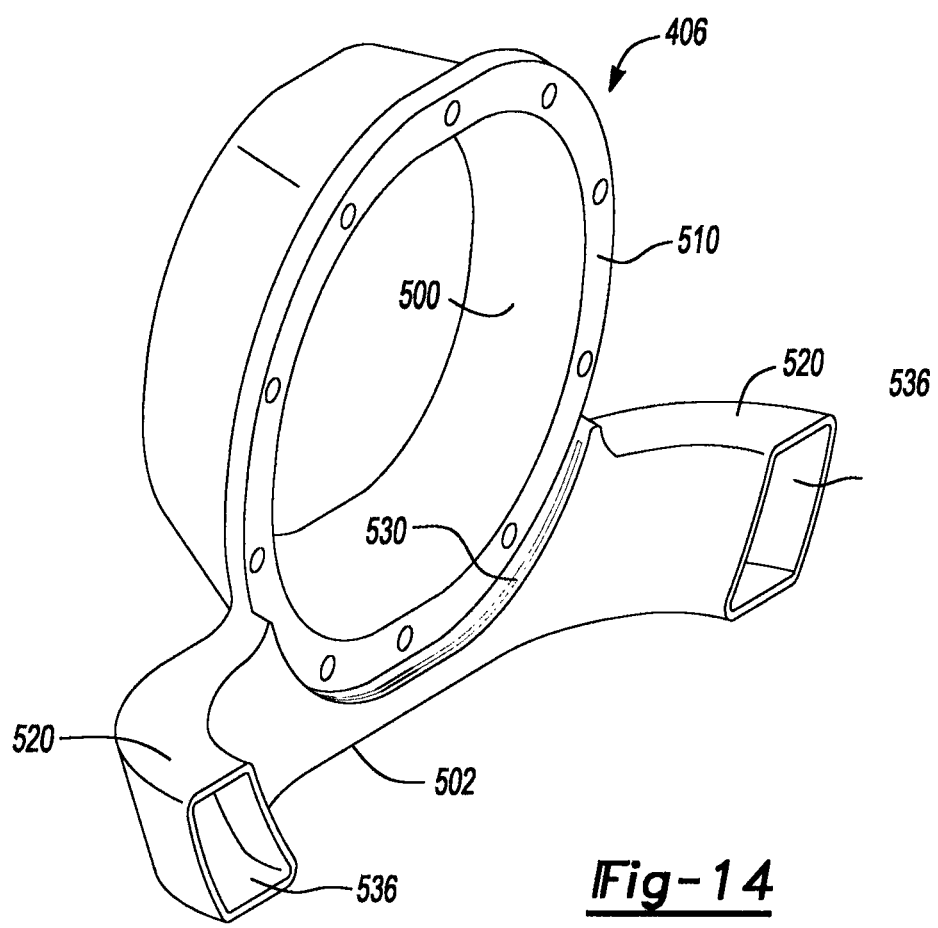
FIG. 14 is a perspective view of a portion of the axle assembly of FIG. 11, illustrating an interior side of a second cover.

In the example of FIGS. 8-10, the heat sink 48b can include a plurality of air channels 120 wherein the respective body 130 of each air channel 120, the oil gallery 124 (FIG. 5), the oil cavity ribs 158 (FIG. 4), the external ribs 156, and the air passage ribs 154 (FIG. 4) are integrally formed with the carrier housing 54 utilizing a suitable manufacturing process, such as investment casting (e.g., lost foam casting). The air channels 120 can be disposed on opposite sides of a vertical plane extending through the rotational axis 106. The respective air inlets 134 can be disposed generally near the front of the carrier housing 54b where the propshaft 20 (FIG. 1) is coupled to the rear axle 22 (FIG. 1) and above the second rotational axis 106 (FIG. 2). The respective air outlets 136 can be disposed generally near the top of and at the rear of the carrier housing 54b where the cover 60 (FIG. 3) is coupled to the carrier housing 54b. The external ribs 156 can extend generally axially along a portion of the length of the air passage 132 to direct the air stream 122 along the body 130.

A further example of an axle assembly constructed in accordance with the teachings of the present disclosure is illustrated in FIGS. 11 through 14. In this example, the axle housing assembly 400 can include a conventional carrier housing 402, a first cover 404 and a second cover 406. The first and second covers 404 and 406 can be removably coupled to the carrier housing 402 via a plurality of bolts 408.

The first cover 404 can include an interior cover member 410, an interior heat sink 412, which can be coupled to an inward facing side 414 of the interior cover member 410, an exterior heat sink 416 that can be coupled to an outward facing side 418 of the interior cover member 410 and a plurality of bolt bosses 420 that extend from the outward facing side 418 of the interior cover member 410. The inward facing side 414 of the interior cover member 410 can include a flat edge 430 that can be configured to sealingly engage a gasket 432 against an exterior face 434 of the carrier housing 402. The interior heat sink 412 can include a plurality of fins 440. Those of ordinary skill in the art will appreciate from this disclosure that lubricant splashed onto the interior cover member 410 and/or the interior heat sink 412 (e.g., from a differential 442 and/or ring gear 444 that is mounted in the carrier housing 402) to thereby transmit heat through the interior heat sink 412 and the interior cover member 410 to the exterior heat sink 416.

The exterior heat sink 416 can include a plurality of first fins 450 and a plurality of second fins 452. The first fins 450 can be longer than the second fins 452 and can cooperate to define a plurality of cooling channels 454. Each of the cooling channels 454 can have an inlet end 456 and an outlet end 458. In the particular example provided, the outlet ends 458 of the cooling channels 454 are angled or curved slightly away from a central axis 460 of the interior cover member 410, while the inlet ends 456 of the cooling channels 454 are more substantially angled or curved away from the central axis 460 of the interior cover member 410. Also in the example provided, at least one of the second fins 452 is disposed between each adjacent pair of the first fins 450. It will be appreciated, however, that the exterior heat sink 416 can have fins of any desired configuration.

The second cover 406 can include an outer cover member 500 and a duct 502. The outer cover member 500 can be sized to cover the first cover 404 and can include a flange 510 that can be abutted against the bolt bosses 420. The bolts 408 can extend through the flange 510 and the bolt bosses and can be threadably engaged to the carrier housing 402 to thereby fixedly but removably couple the first and second covers 404 and 406 to the carrier housing 402.

The duct 502 can include a pair of duct members 520 that can be coupled to a common outlet 530. Each of the duct members 520 can include an inlet 536 for receiving air into the duct 502. In the example provided, each duct member 520 is arcuate in shape to extend around the carrier housing 402 and to orient the inlets 536 into a position where air can be forced or driven through the inlet 536 during the operation of the axle assembly 400 (i.e., when the axle assembly 400 is employed to propel a vehicle in a predetermined, e.g., forward, direction). Air received through the inlets 536 is directed by the duct members 520 to the common outlet 530. The common outlet 530 can extend about a portion or segment of the first cover 404 that can correspond to the locations of the inlet ends 456 of the cooling channels 454. The common outlet 530 can be configured to discharge the air into a gap 540 that can be disposed between the interior cover member 410 and the outer cover member 500. In this regard, the air flowing between the interior cover member 410 and the outer cover member 500 is transmitted through the cooling channels 454 and receives heat from the exterior heat sink 416 (i.e., the exterior heat sink 416 rejects heat to the air flowing through the cooling channels 454). It will be appreciated that the contour of the inlet ends 456 of the cooling channels 454 is configured to efficiently direct the air exiting the common outlet 530 into the several cooling channels 454. It will be appreciated that flow diverters (not shown) could be installed in the duct 502 to direct the air out of the common outlet 530 in a desired manner (e.g., so that the flowing air can be distributed evenly across the exterior heat sink 416 or so that more air can be directed to predetermined portions of the exterior heat sink 416).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly for propelling a vehicle, the axle assembly comprising:
    a housing assembly having a housing structure that defines a cavity with an opening;
    a differential assembly received in the cavity and being supported for rotation by the housing structure about a first axis;
    a pair of axle shafts driven by the differential assembly; and
    an air channel having a hollow body that extends between a tubular leading end and a tubular trailing end, the hollow body being mounted to the housing assembly so that the leading end projects away from the housing structure such that the leading end is adapted to passively intake air from an airstream that passes around the housing assembly as the vehicle is operated in a predetermined direction.

2. The axle assembly of claim 1, wherein the housing assembly further includes a cover removably coupled to the housing structure to cover the opening in the housing structure.

3. The axle assembly of claim 2, wherein at least a first portion of the air channel is integrally formed with the cover.

4. The axle assembly of claim 3, wherein a second portion of the air channel is integrally formed with the housing structure.

5. The axle assembly of claim 2, wherein the leading end of the air channel extends from the cover in a direction toward the housing structure.

6. The axle assembly of claim 2, wherein the air channel is contoured such that air flowing between the leading end and the trailing end changes direction by about 90 degrees.

7. The axle assembly of claim 2, wherein a plurality of cooling fins are formed within the air channel.

8. The axle assembly of claim 7, wherein a plurality of cooling fins are formed on an interior surface of the cover.

9. The axle assembly of claim 2, wherein an oil gallery is formed within one of the housing structure and the cover and wherein at least a portion of the oil gallery is disposed between the air channel and one of an interior surface of the housing structure, an interior surface of the cover, and the interior surfaces of the housing structure and the cover.

10. The axle assembly of claim 1, wherein at least a portion of the air channel is integrally formed with the housing structure.

11. The axle assembly of claim 1, wherein the leading end of the air channel is disposed at a first distance from the second axis and the trailing end of the air channel is disposed at a second distance from the second axis wherein the second distance is greater than the first distance.

12. The axle assembly of claim 1, wherein the air channel is contoured such that air flowing between the leading end and the trailing end changes direction by about 90 degrees.

13. The axle assembly of claim 1, wherein a plurality of cooling fins are formed within the air channel.

14. The axle assembly of claim 13, wherein a plurality of cooling fins are formed on an interior surface of the housing structure.

15. The axle assembly of claim 1, wherein an oil gallery is formed within the housing structure and wherein at least a portion of the oil gallery is disposed between the air channel and an interior surface of the housing structure.

16. A driveline component for propelling a vehicle, the driveline component comprising:
a housing assembly;
a gearset mounted in the housing assembly; and
an air channel coupled to the housing assembly, the air channel having an open leading end and an open trailing end, the leading end projecting away from the housing assembly and being positioned to receive air flowing over the driveline component when the vehicle is operated in a predetermined direction.

17. The axle assembly of claim 16, wherein a plurality of cooling fins are formed on at least one of an interior surface of the air channel, an exterior surface of the air channel, an exterior surface of the housing assembly, and an interior surface of the housing assembly.

18. The axle assembly of claim 16, wherein an oil gallery is formed between an interior surface of the housing assembly and the air channel.

19. An axle assembly comprising:
a carrier housing that defines a cavity, the carrier housing including a mounting flange;
a differential assembly received in the cavity and supported for rotation by the carrier housing;
a cover mounted to the mounting flange of the carrier housing to close a rear side of the cavity; and
an air channel mounted to the cover, the air channel comprising a tubular body having an open leading end and a trailing end, the leading end extending around the carrier housing so as to terminate forwardly of the mounting flange.

20. The axle assembly of claim 19, wherein a plurality of cooling fins are formed on at least one of an interior surface of the air channel, an exterior surface of the air channel, an exterior surface of the carrier housing, and an interior surface of the carrier housing.

21. The axle assembly of claim 19, wherein an oil gallery is formed between an interior surface of the carrier housing and the air channel.

* * * * *